(12) United States Patent
Victora et al.

(10) Patent No.: US 6,649,254 B1
(45) Date of Patent: Nov. 18, 2003

(54) COMPENSATED CRYSTALLINE SUPERLATTICE FERRIMAGNETS

(75) Inventors: Randall Harry Victora, New Brighton, MN (US); Charles Frederick Brucker, Pleasanton, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 223 days.

(21) Appl. No.: 09/777,220

(22) Filed: Feb. 5, 2001

Related U.S. Application Data
(60) Provisional application No. 60/180,296, filed on Feb. 4, 2000.

(51) Int. Cl.[7] .................................................. G11B 5/66
(52) U.S. Cl. .................. 428/212; 428/332; 428/336; 428/692; 428/694 TM; 428/694 MM; 428/694 EC; 428/900; 427/128; 427/129; 427/130; 360/113
(58) Field of Search ........................ 428/800, 694 TM, 428/694 MM, 694 EC, 692, 212, 332, 336; 360/113; 427/128–130

(56) References Cited

U.S. PATENT DOCUMENTS

| | | | |
|---|---|---|---|
| 5,465,185 A | 11/1995 | Heim et al. | |
| 5,528,440 A | 6/1996 | Fontana et al. | |
| 5,565,266 A | 10/1996 | Hatwar et al. | |
| 5,574,605 A | 11/1996 | Baumgart et al. | |
| 5,617,405 A | 4/1997 | Victora et al. | |
| 5,668,523 A | 9/1997 | Chen et al. | |
| 5,701,222 A | 12/1997 | Gill et al. | |
| 5,708,358 A | 1/1998 | Ravipati | |
| 5,715,225 A | 2/1998 | Victora et al. | |
| 5,750,274 A | 5/1998 | Hatwar et al. | |
| 5,796,688 A | 8/1998 | Gage et al. | |
| 5,818,685 A | 10/1998 | Thayamballi et al. | |
| 5,858,565 A | 1/1999 | Victora et al. | |
| 5,966,012 A | 10/1999 | Parkin | |
| 5,986,978 A | 11/1999 | Rottmayer et al. | |
| 6,084,405 A | 7/2000 | Suzuki | |
| 6,134,090 A | 10/2000 | Mao et al. | |
| 6,219,212 B1 | 4/2001 | Gill et al. | |
| 6,385,082 B1 * | 5/2002 | Abraham | 365/171 |
| 6,400,535 B1 | 6/2002 | Shimazawa et al. | |
| 6,493,164 B1 * | 12/2002 | Kikitsu | 360/59 |
| 6,579,590 B2 * | 6/2003 | Ju | 428/65.3 |

OTHER PUBLICATIONS

R. H. Victora et al., "Predicted Spin And Orbital Contributions To The Magnetic Structure Of Co/2X Superlattices" (Abstract), *J. Appl. Phys.*, vol. 70, No. 10, Nov. 15, 1991, pp. 5880.

* cited by examiner

*Primary Examiner*—Leszek Kiliman
(74) *Attorney, Agent, or Firm*—Alan G. Towner, Esq.; Pietragallo, Bosick & Gordon

(57) ABSTRACT

The present invention relates to compensated crystalline superlattice ferrimagnets. The ferrimagnets include multiple ferromagnetic layers having different magnetic disordering temperatures in combination with antiferromagnetically coupled layers. The crystalline ferromagnetic layers may include metals or alloys such as Ni, Co and Fe. The crystalline antiferromagnetically coupled layers may include metals or alloys such as Rh, Ir, Cr, Ru, Os, W and Mn. The superlattice ferrimagnets may be used in such applications as data storage or memory layers in thermally assisted magnetic recording media.

27 Claims, 1 Drawing Sheet

COMPENSATED CRYSTALLINE SUPERLATTICE FERRIMAGNETS

CROSS REFERENCE TO RELATED APPLICATION

This application claims the benefit of U.S. Provisional Patent Application Serial No. 60/180,296 filed Feb. 4, 2000. This application is related to McDaniel et al., U.S. Application Ser. No. 09/777,355 entitled "Media for a Thermally Activated Read Storage System" filed Feb. 5, 2001, now pending which is incorporated herein by reference.

FIELD OF THE INVENTION

The present invention relates to compensated crystalline superlattice ferrimagnets. The ferrimagnets include multiple crystalline ferromagnetic layers in combination with crystalline antiferromagnetically coupled layers. The superlattice ferrimagnets may be used in such applications as thermally assisted magnetic data storage disks and the like.

BACKGROUND INFORMATION

Ferrimagnets are magnetic materials in which the magnetic spins of one class of atoms are opposed to the magnetic spins of another class of atoms within the same material. Compensated ferrimagnets have the additional feature that there exists a temperature for which the spins on the two classes of atoms cancel. An example is the amorphous rare-earth transition metal alloys used in magneto-optical disks. Compensated ferrimagnets have the useful property that their magnetizations vary from zero at the compensation temperature to large values at temperatures remote from the compensation temperature. This leads to large variations in coercivity, which varies inversely with magnetization. These variations can be exploited for various applications such as magneto-optical disks.

Ferrimagnets have been proposed for use as data storage or memory layers in thermally assisted magnetic recording systems. For example, U.S. Pat. No. 5,889,641 to Belser et al., which is incorporated herein by reference, discloses the use of a DyFeCo ferrimagnetic alloy as a data storage layer in a thermally assisted magnetic recording system.

In some applications, crystalline materials are grown directly on the ferrimagnet, e.g., optically assisted magnetic recording (OAMR). This is difficult to accomplish with conventional amorphous ferrimagnet materials currently in use. Furthermore, amorphous ferrimagnetic materials based on rare earth-transition metal alloys are susceptible to environmental corrosion due to the high chemical reactivity of the rare earth components. OAMR and other applications, such as near-field optical recording and thermally assisted magnetic recording systems, require the recording head structure to be positioned in close proximity to the recording layer. This may preclude the use of a thick protective overcoat layer, thus rendering conventional RE-TM alloys susceptible to corrosion.

Although some types of crystalline compensated ferrimagnets such as rare-earth transition metal compounds are known, they exhibit additional problems. First, the crystalline materials are difficult to make with traditional vacuum deposition techniques unless a post-anneal treatment is used, which can destroy many types of substrates. Second, their compensation temperatures are difficult to adjust because the crystalline compounds will typically only form at precise ratios of the constitutive elements. This results in very limited choices of compensation temperatures. Finally, many of the materials have a cubic crystal structure that yields a multi-directional magnetic anisotropy. This can be a disadvantage because uniaxial anisotropy is often desired.

It is known that a superlattice consisting of one layer of Co alternating with two layers of Rh or Ir produces an antiferromagnet (R. H. Victora and J. M. MacLaren, *J. Appl. Phys.* 70, 5880, 1991). In this superlattice, antiferromagnetic coupling occurs within the Rh or Ir layers and appears to be independent of the ferromagnet material chosen, provided that the ferromagnet material has sufficient magnetic strength to polarize the Rh or Ir layers.

The present invention has been developed in view of the foregoing.

SUMMARY OF THE INVENTION

The present invention provides compensated crystalline superlattice ferrimagnets which include different alternating ferromagnetic layers separated by antiferromagnetically coupled layers. If the ferromagnetic layers have different temperature dependence of the magnetization, then a compensation point may be provided. For example, the structure may consist of the following repeating structure: A/B/B/C/B|B; where A and C are ferromagnetic layers and B represents antiferromagnetically coupled layers. The ferromagnetic A and C layers may comprise metals or alloys such as Ni, Co or Fe, while the antiferromagnetically coupled B layers may comprise metals or alloys such as Rh, Ir, Cr, Ru, Os, W, Mn and the like. Each of the layers need not be a single element but rather may comprise alloys of different metals. The thickness of each B layer may be one monolayer, and the thickness of each A and C layer may be selected to yield a compensation point at the desired temperature. For example, the A layer(s) may be chosen to be a trilayer of Ni, while the C layer(s) may be a monolayer of Co. Fine-tuning may be accomplished by adding a dopant to change Curie temperatures or magnetizations.

The present superlattice structures provide advantages in comparison with other crystalline materials. The superlattice materials can be easily deposited without post-anneal treatments. For example, sputtering techniques using a rotating substrate may be used to control the thickness and dopants of the ferromagnetic layers in order to obtain the desired compensation temperature. Furthermore, the present materials may exhibit uniaxial anisotropy.

An aspect of the present invention is to provide a compensated crystalline superlattice ferrimagnet comprising a first ferromagnetic layer, a second ferromagnetic layer having a different magnetic disordering temperature than the first ferromagnetic layer, and antiferromagnetically coupled layers between the first and second ferromagnetic layers.

Another aspect of the present invention is to provide a method of making a compensated crystalline superlattice ferrimagnet. The method comprises depositing a first ferromagnetic layer on a substrate, depositing antiferromagnetically coupled layers on the first ferromagnetic layer, and depositing a second ferromagnetic layer on the antiferromagnetically coupled layers.

A further aspect of the present invention is to provide a thermally assisted magnetic recording media comprising a substrate, a memory layer deposited on the substrate, and a copy layer deposited on the memory layer. The memory layer comprises a compensated crystalline superlattice ferrimagnet including a first ferromagnetic layer, a second ferromagnetic layer having a different magnetic disordering temperature than the first ferromagnetic layer, and antiferromagnetically coupled layers between the first and second ferromagnetic layers.

These and other aspects of the present invention will be more apparent from the following description.

DETAILED DESCRIPTION

Figure 1:
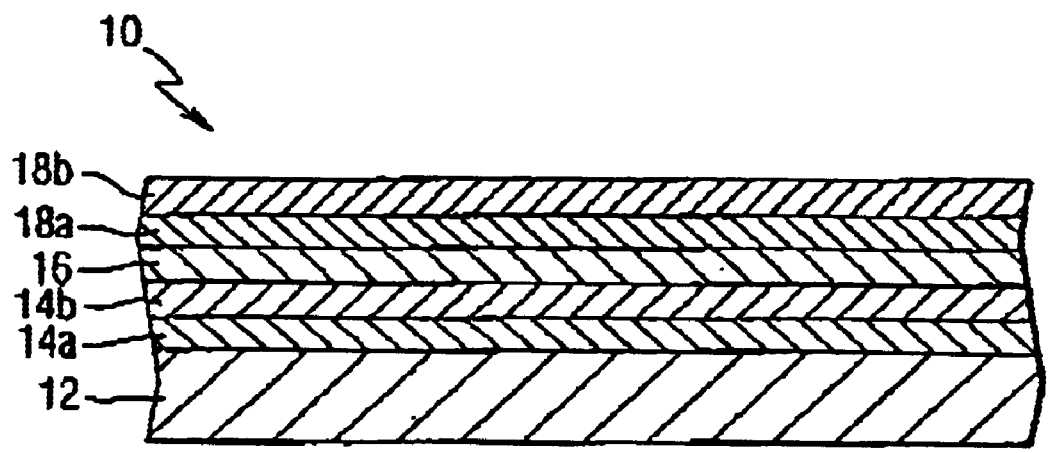
FIG. 1 is a partially schematic side sectional view of a compensated crystalline superlattice ferrimagnet in accordance with an embodiment of the present invention.

FIG. 1 schematically illustrates a compensated crystalline superlattice ferrimagnet 10 in accordance with an embodiment of the present invention. The ferrimagnet 10 includes a first ferromagnetic layer 12. Antiferromagnetically coupled layers 14a and 14b are deposited on the first ferromagnetic layer 12. A second ferromagnetic layer 16 is deposited on the antiferromagnetically coupled layers 14a and 14b. Additional antiferromagnetically coupled layers 18a and 18b are deposited on the second ferromagnetic layer 16. As used herein, the term "ferromagnetic layer" means a layer of material characterized by cooperative alignment of electron spins within magnetic domains at temperatures below a magnetic disordering temperature, i.e., the Curie temperature. The term "antiferromagnetically coupled layers" means layers of materials in which the electron spins in one layer are opposed to the electron spins in another layer, i.e., anti-parallel electron spins. The term "compensated crystalline superlattice ferrimagnet" as used herein means a multilayer compensated ferrimagnet in which the layers are crystallographically ordered.

The ferromagnetic layers 12 and 16 are made of ferromagnetic materials such as Ni, Co and Fe. In order to provide a temperature at which the spins in the ferromagnetic layers compensate, or cancel, it is necessary that the ferromagnetic layers have different magnetic disordering temperatures. The use of Co and Ni is one such example, for which the ferromagnetic Co layer has a higher magnetic disordering temperature than the ferromagnetic Ni material. However, the use of ferromagnetic layers with different compositions is not necessarily the only method to achieve magnetic compensation behavior. The magnetic disordering temperature may also depend on the dimensionality of a material. For example, the magnetic disordering temperature of a ferromagnetic material in bulk or three dimensional form may be different from that of the same material in monolayer or two dimensional form. Thus, compensation behavior may also be achieved using the same composition but different thicknesses for the first and second ferromagnetic layers.

The ferromagnetic layers 12 and 16 may be alloyed or doped in order to change their properties, e.g., Curie temperature, magnetization and/or environmental stability. The metals Ni, Co and Fe, and alloys based on these elemental metals, are preferred for the ferromagnetic layers 12 and 16 because they do not require impractically high fabrication temperatures to develop technologically useful magnetic properties. In principal, however, any ferromagnetic material with sufficient magnetic strength to polarize the antiferromagnetically coupled layers can be used.

The antiferromagnetically coupled layers 14a, 14b, 18a and 18b may be made of metals or alloys comprising Rh, Ir, Cr, Ru, Os, W, Mn and the like. For example, the antiferromagnetically coupled layers 14a, 14b, 18a and 18b may be made of the same material, such as either Rh or Ir. However, the antiferromagnetically coupled layers 14a and 14b do not have to be made from the same material. Similarly, the antiferromagnetically coupled layers 18a and 18b do not need to be made from the same material. Furthermore, the combined antiferromagnetically coupled layers 14a and 14b do not have to be identical to the combined antiferromagnetically coupled layers 18a and 18b.

In accordance with the present invention, the thicknesses of the layers of the superlattice ferrimagnet 10 may be controlled in order to produce the desired magnetic characteristics. The thickness of each of the ferromagnetic layers 12 and 16 is chosen to yield a compensation point at the desired temperature. The ferromagnetic layers 12 and 16 may each comprise a single atomic layer or, alternatively, may comprise multiple atomic layers. For example, in the embodiment shown in FIG. 1, the first ferromagnetic layer 12 may comprise three atomic layers of Ni, while the second ferromagnetic layer 16 may comprise a single atomic layer of Co. Each of the antiferromagnetically coupled layers 14a, 14b, 18a and 18b may comprise a single atomic layer. For example, each of the antiferromagnetically coupled layers 14a, 14b, 18a and 18b may comprise a monolayer of Rh or Ir. The antiferromagntically coupled pair of layers 14a and 14b may thus be two monolayers thick in total in order to maximize their antiferromagnetic coupling strength. Similarly the pair of layers 18a and 18b may comprise at total of two monolayers. The thickness of each of these layer pairs can be controlled to be more or less than two monolayers to adjust the strength of the antiferromagnetic coupling, if desired.

In accordance with the present invention, the ferromagnetic layers and antiferromagnetically coupled layers form a crystalline superlattice ferrimagnet in which the layers are crystallographically ordered. For example, the layers may possess hexagonal and/or cubic crystal structures such as hexagonal closed packed and/or face centered cubic structures. The layers preferably comprise crystal structures which exhibit uniaxial magnetic anisotropy. For instance, the crystal structure may include a hexagonal close packed structure having a c-axis substantially perpendicular to the plane of the layer. The layers are typically polycrystalline with preferred average grain sizes less than about 50 nm, e.g., of from about 2 to about 20 nm. For many applications, an average grain size for each layer may be from about 5 to about 10 nm.

The present compensated crystalline superlattice ferrimagnets preferably have a controlled compensation temperature. For example, the compensation temperature may be relatively close to room temperature in order to provide long term stability in many applications. A compensation temperature of from about 0 to about 80° C. may be suitable for many applications.

The combined layers of the superlattice ferrimagnet 10 shown in FIG. 1 may be repeated as necessary in order to build up multiple superlattices to achieve the desired properties. Thus, two or more superlattice structures as shown in FIG. 1 may be deposited. For example, for many applications, from 1 to 20 superlattice structures may be provided. When multiple superlattices are deposited, each superlattice may contain identical sets of ferromagnetic and antiferromagnetically coupled layers. Alternatively, the superlattices may comprise different types of ferromagnetic layers and/or different types of antiferromagnetically coupled layers.

The present superlattice ferrimagnet may be made by deposition techniques such as sputtering, evaporation or molecular beam epitaxy (MBE). For example, the layers of the superlattice ferrimagnet 10 shown in FIG. 1 may be deposited by sputtering the desired number of atomic layer (s) of each material onto a rotating substrate. Commercially available dc or rf magnetron sputtering systems utilizing sputtering targets in a variety of shapes and sizes and Ar, Kr and/or Xe inert sputtering gas are suitable for fabricating such multilayers.

Figure 2:
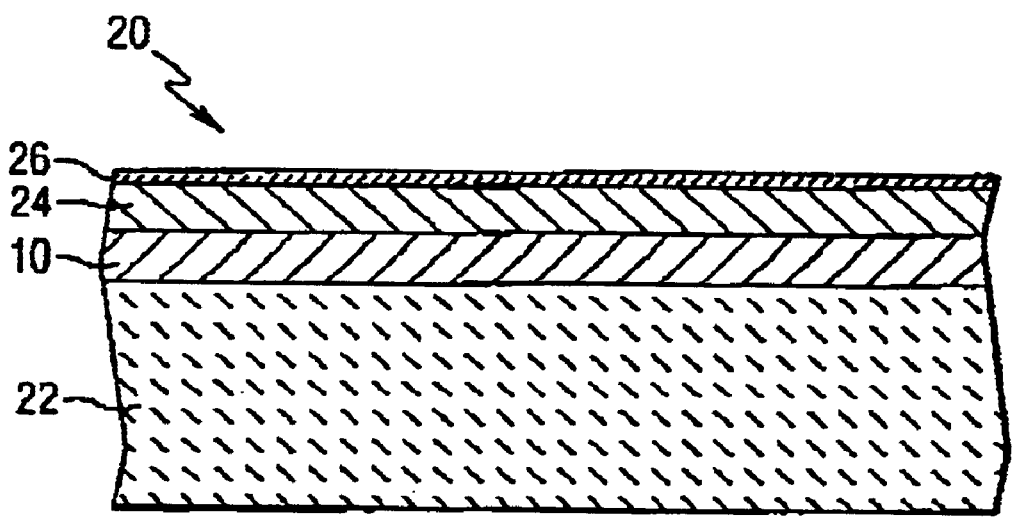
FIG. 2 is a partially schematic side sectional view of a thermally assisted magnetic recording media, including a compensated crystalline superlattice ferrimagnet memory layer in accordance with an embodiment of the present invention.

In accordance with an embodiment of the present invention, compensated crystalline superlattice ferrimagnets may be used as the data storage or memory layer in a thermally assisted magnetic recording media. FIG. 2 schematically illustrates a thermally assisted magnetic recording media 20. The media 20 includes a substrate 22 made of any suitable material such as an aluminum alloy, glass or glass ceramic. A memory layer comprising the superlattice ferrimagnet 10 is deposited on the substrate 22. The superlattice ferrimagnet 10 may comprise one or more superlattices, for example, a single or multiple superlattices as shown in FIG. 1. A copy layer 24 is deposited on the superlattice ferrimagnet memory layer 10. Preferably, the copy layer 24 is deposited directly on the superlattice ferrimagnet memory layer 10. However, an intermediate layer can be deposited between the memory and copy layers to mediate the strength of the magnetic coupling between the memory and copy layers. The copy layer 24 may be made of a material such as Co/Pt or Co/Pd multilayers, or any other material suitable for use as a perpendicular magnetic recording layer. A thin protective coating 26 made of a suitable material such as diamond-like carbon, zirconia, silicon nitride or other oxides, nitrides or carbides may be deposited on the copy layer 24.

In the embodiment shown in FIG. 2, the superlattice ferrimagnet 10 may have a total thickness of from about 2 to about 50 nm, typically from about 5 to about 20 nm. The copy layer 24 may have a thickness of from about 2 to about 50 nm, typically from about 5 to about 20 nm.

The thermally assisted magnetic recording media 20 shown in FIG. 2 may be made by sputtering the ferromagnetic and antiferromagnetically coupled layers of the superlattice ferrimagnet 10 onto the substrate 22, for example, using sputtering techniques. The copy layer 24 may then be deposited on the superlattice ferrimagnet 10 by techniques such as sputtering, evaporation or MBE.

The thermally assisted magnetic recording media 20 shown in FIG. 2 may be used in a thermally assisted magnetic recording system. For example, the recording media 20 may be used in a thermally assisted recording system as set forth in U.S. Pat. No. 5,889,641 to Belser et al. When used as a memory layer in a thermally assisted magnetic recording media 20, the superlattice ferrimagnet 10 preferably has a compensation temperature relatively close to room temperature. At the compensation temperature, the magnetization of the superlattice ferrimagnet 10 is zero. As the temperature is increased above the compensation temperature, e.g., during thermally assisted writing operations, the magnetization of the heated superlattice ferrimagnet 10 increases. Since magnetization is inversely proportional to coercivity, the increased temperature of the superlattice ferrimagnet 10 results in a substantial decrease in its coercivity. Thus, thermally assisted writing may be accomplished by heating a localized region of the superlattice ferrimagnet 10 in order to lower its coercivity in the localized heated region.

In thermally assisted magnetic recording systems, the writing temperature may typically range from about 100 to 300° C., for example, a writing temperature of about 200° C. may be used. Preferred superlattice ferrimagnets for use as memory layers in accordance with this embodiment exhibit suitable coercivities at such elevated writing temperatures. For example, coercivities of from about 1,000 to about 5,000 Oe at temperatures of from about 100 to 300° C. may be suitable for the present superlattice ferrimagnets when used as memory layers in thermally assisted magnetic recording media.

With regard to magnetic recording applications, the compensated crystalline superlattice ferrimagnets of the present invention provide the capability of increasing the ultimate linear recording density that can be supported in the superlattice material. If the superlanice material is continuously exchange coupled, the transition width between domains of opposite magnetization will be determined by the domain wall width: $\delta=\pi(A/K)^{1/2}$; where A and K are the magnetic exchange and anisotropy constants, respectively. Unlike conventional amorphous RE-TM materials, however, the present superlattice material may be polycrystalline and exhibit a columnar grain structure. The existence of boundaries between grains may provide a means to break exchange, thereby decreasing the transition width to the width of the grain boundary. For example, exchange may be broken or weakened by adding a suitable dopant to the magnetic alloy, which can be thermally activated to segregate at the grain boundaries.

The use of a bulk dopant plus heat is one possible approach to achieving grain decoupling in superlattice media. Dopants may enhance the diffusion of decoupling elements to the grain boundaries. However, if problems arise due to, e.g., degradation of magnetic properties resulting from the presence of dopants in the grains or heat-induced interdiffusion at the layer boundaries, other means of introducing the dopant may be used. For example, a reservoir of grain decoupling material could be deposited in the form of additional layer(s) above and/or below the superlattice. The layer providing the reservoir for the decoupling material could at the same time seed the desired crystal texture and grain structure for the superlattice layer. If necessary, diffusion of this material into the grain boundaries may be facilitated by application of heat.

In the case of vacancy diffusion, small atomic size is desirable for maximum mobility. Elements selected from the first three rows of the Periodic Table may be used, e.g., Be, B, Mg, Si, Ti or Cr. Since grain boundary volume is small, the reservoir layer thickness could potentially be only a few angstroms thick. Since the activation energy for grain boundary diffusion, which can occur via vacancy diffusion, is typically less than that for bulk diffusion, the process temperature may be reduced. Various methods of heat application could be used, e.g., conventional annealing, rapid thermal annealing and laser annealing. The appropriate time-temperature parameters may be determined by monitoring magnetic properties such as perpendicular hysteresis to determine when decoupling occurs between grains with minimal degradation of intragranular properties.

Whereas particular embodiments of this invention have been described above for purposes of illustration, it will be evident to those skilled in the art that numerous variations of the details of the present invention may be made without departing from the invention as defined in the appended claims.

What is claimed is:

1. A compensated crystalline superlattice ferrimagnet comprising:

a first ferromagnetic layer;

a second ferromagnetic layer having a different magnetic disordering temperature than the first ferromagnetic layer; and antiferromagnetically coupled layers between the first and second ferromagnetic layers.

2. The compensated crystalline superlattice ferrimagnet of claim 1, wherein the first and second ferromagnetic layers have different compositions.

3. The compensated crystalline superlattice ferrimagnet of claim 1, wherein the first and second ferromagnetic layers have different thicknesses.

4. The compensated crystalline superlattice ferrimagnet of claim 1, wherein the first and second ferromagnetic layers have different compositions and different thicknesses.

5. The compensated crystalline superlattice ferrimagnet of claim 1, wherein the first and second ferromagnetic layers comprise at least one metal selected from Ni, Co and Fe.

6. The compensated crystalline superlattice ferrimagnet of claim 1, wherein the first ferromagnetic layer comprises Ni, Co or Fe, the second ferromagpetic layer comprises Ni, Co or Fe, and the first and second ferromagnetic layers have different compositions.

7. The compensated crystalline superlattice ferrimagnet of claim 1, wherein the antiferromagnetically coupled layers comprise at least one metal selected from Rh, Ir, Cr, Ru, Os, W and Mn.

8. The compensated crystalline superlattice ferrimagnet of claim 1, wherein the antiferromagnetically coupled layers comprise Rh.

9. The compensated crystalline superlattice ferrimagnet of claim 1, wherein the antiferromagnetically coupled layers comprise Ir.

10. The compensated crystalline superlattice ferrimagnet of claim 1, wherein at least one of the first and second ferromagnetic layers comprises a single atomic layer.

11. The compensated crystalline superlattice ferrimagnet of claim 1, wherein each of the antiferromagnetically coupled layers comprises a single atomic layer.

12. The compensated crystalline superlattice ferrimagnet of claim 1, wherein the first and second ferromagnetic layers and the antiferromagnetically coupled layers have average grain sizes of from about 2 to about 20 nm.

13. The compensated crystalline superlattice ferrimagnet of claim 1, wherein the superlattice ferrimagnet has substantially uniaxial magnetic anisotropy.

14. The compensated crystalline superlattice ferrimagnet of claim 13, wherein the substantially uniaxial magnetic anisotropy is oriented in a direction substantially perpendicular to planes of the layers.

15. The compensated crystalline superlattice ferrimagnet of claim 1, wherein the superlattice ferrimagnet has a compensation temperature of from about 0 to about 80° C.

16. A method of making a compensated crystalline superlattice ferrimagnet, the method comprising:

depositing a first ferromagnetic layer on a substrate;

depositing antiferromagnetically coupled layers on the first ferromagnetic layer; and depositing a second ferromagnetic layer on the antiferromagnetically coupled layers, wherein the first and second ferromagnetic layers have different disordering temperatures.

17. The method of claim 16, wherein the first and second ferromagnetic layers have different compositions.

18. The method of claim 16, wherein the first and second ferromagnetic layers comprise at least one metal selected from Ni, Co and Fe, and the antiferromagnetically coupled layers comprise at least one metal selected from Rh, Ir, Cr, Ru, Os, W and Mn.

19. The method of claim 16, wherein the superlattice ferrimagnet has substantially uniaxial magnetic anisotropy.

20. A thermally assisted magnetic recording media comprising:

a substrate;

a memory layer deposited on the substrate, wherein the memory layer comprises a compensated crystalline superlattice ferrimagnet including:

a first ferromagnetic layer;

a second ferromagnetic layer having a different magnetic disordering temperature than the first ferromagnetic layer; and antiferromagnetically coupled layers between the first and second ferromagnetic layers; and a copy layer deposited on the memory layer.

21. The thermally assisted magnetic recording media of claim 20, wherein the first and second ferromagnetic layers have different compositions.

22. The thermally assisted magnetic recording media of claim 20, wherein the first and second ferromagnetic layers comprise at least one metal selected from Ni, Co and Fe, and the antiferromagnetically coupled layers comprise at least one metal selected from Rh, Ir, Cr, Ru, Os, W and Mn.

23. The thermally assisted magnetic recording media of claim 20, wherein the superlattice ferrimagnet has substantially uniaxial magnetic anisotropy.

24. The thermally assisted magnetic recording media of claim 20, wherein the memory layer comprises a plurality of the compensated crystalline superlattice ferrimagnets.

25. The thermally assisted magnetic recording media of claim 20, wherein the copy layer comprises Co/Pt or Co/Pd multilayers.

26. The thermally assisted magnetic recording media of claim 20, wherein the memory layer has a thickness of from about 2 to about 50 nm, and the copy layer has a thickness of from about 2 to about 50 nm.

27. The thermally assisted magnetic recording media of claim 20, wherein the superlattice ferrimagnet has a compensation temperature of from about 0 to about 80° C.

* * * * *

UNITED STATES PATENT AND TRADEMARK OFFICE
CERTIFICATE OF CORRECTION

PATENT NO. : 6,649,254 B1
DATED : November 18, 2003
INVENTOR(S) : Randall Harry Victora and Charles Frederick Brucker It is certified that error appears in the above-identified patent and that said Letters Patent is hereby corrected as shown below:

Column 2,
Line 16, ".provides" should read -- provides --.
Line 22, "A/B/B/C/BIB" should read -- A/B/B/C/B/B --.

Column 6,
Line 14, "superlanice" should read -- superlattice --.

Column 7,
Line 21, "ferromagpetic" should read -- ferromagnetic --.

Signed and Sealed this

Twenty-eighth Day of September, 2004

JON W. DUDAS
*Director of the United States Patent and Trademark Office*